United States Patent Office 3,312,445
Patented Apr. 4, 1967

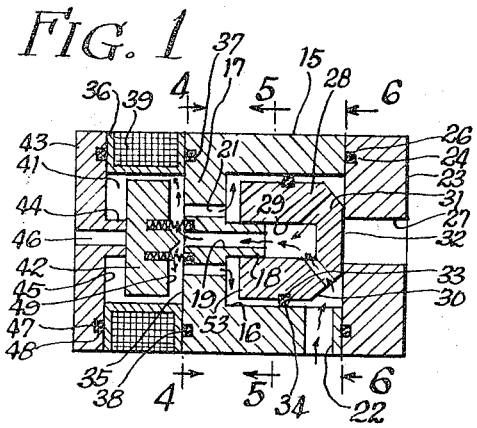
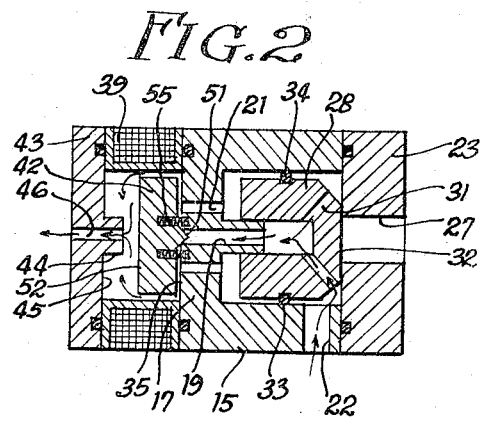
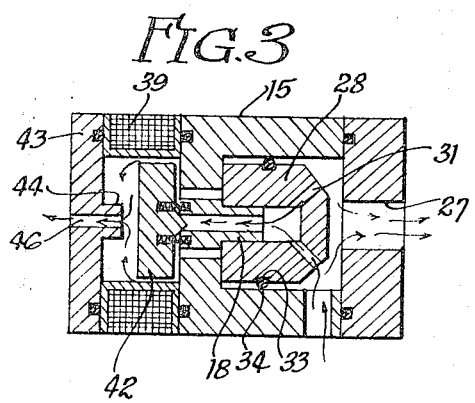
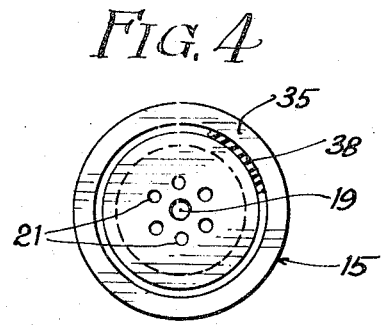
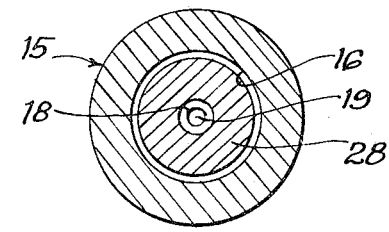
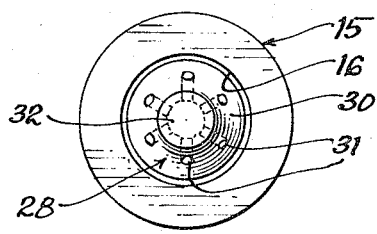
INVENTORS
Sam S. Trombatore
Wilbur J. Bradtke
William J. Griswold

3,312,445
SOLENOID OPERATED VALVE
Sam S. Trombatore, Des Plaines, Wilbur J. Bradtke, Park Ridge Manor, and William J. Griswold, Bridgeview, Ill., assignors to Webcor, Inc., Chicago, Ill., a corporation of Illinois
Filed July 1, 1964, Ser. No. 379,523
5 Claims. (Cl. 251—30)

This invention relates to a solenoid operated valve.

One of the objects of this invention is the provision of a very rapid cycling solenoid operated valve for use in high pressure fluid applications.

Another object of this invention is the provision of a valve of the foregoing type which functions to release a large volume of high pressure fluid through a relatively large orifice.

Another object of this invention is the provision of a valve of the foregoing type embodying a main valve and a pilot valve and having only two moving parts, each independently moveable, with all parts being arranged in concentric relation to a common axis and having no wear surfaces, thereby affording a maximum service life to the valve.

A further object of this invention is the provision of a valve construction of the foregoing type in which the pilot piston and solenoid armature are one and the same, and in which fluid pressure is employed to assist in the movement of the pilot piston to operative position, thereby very materially reducing the force required to close the pilot valve, as well as reducing the electric power consumption required for effecting such closing.

Still a further object of this invention is the provision of a valve construction which lends itself to miniaturization, whereby a valve construction according to this invention, may be made in a size approximately only one-fifth that of a conventional high pressure valve for comparable service conditions.

A further object of this invention is the provision of a valve construction which lends itself to straight-line assembly techniques, requiring no assembly adjustments and affording a high degree of economy in the labor required for assembly.

Still a further object of this invention is the provision of a valve construction of the foregoing type in which all of the parts are balanced, permitting operation of the device under applications involving high stress loads.

Other and further objects and advantages of this invention will become apparent from the following description when the same is considered in connection with the accompanying drawings in which FIG. 1 is a vertical cross-sectional view of a valve construction, in accordance with our invention, and showing the main valve in closed position.

FIG. 2 is a similar view illustrating the relationship of the parts immediately after the solenoid coil has been energized to move the pilot piston to closed position.

FIG. 3 is a similar view illustrating the relationship of the parts when the main valve is in fully opened position.

FIG. 4 is a cross-sectional view taken substantially on line 4—4 of FIG. 1.

FIG. 5 is a cross-sectional view taken substantially on line 5—5 of FIG. 1, and

FIG. 6 is a cross-sectional view taken substantially on line 6—6 of FIG. 1.

Referring to the drawings, the numeral 15 indicates a main valve body having a cylindrical chamber 16 open at one end. The opposite end of the chamber is closed by a wall 17 which is provided with an integral cylindrical neck portion or projection 18 extending into the chamber 16. The wall 17 and neck portion 18 are drilled to provide an axial passage 19. Additionally, the wall 17 is provided with a series of circumferentially spaced passages 21 extending parallel to the axial passage 19 and arranged on a circle exteriorly of the neck portion 18. An inlet port 22 communicates with the chamber 16 and is intended to be connected to a source of pneumatic pressure fluid, such as compressed air or the like.

An end plate 23 provided on one face thereof with an annular groove 24 in which is received an O-ring 26 abuts the end face of the body 15 in fluid tight relationship therewith and affords a closure for the chamber 16. The end plate 23 is provided with an axial discharge port 27.

A main piston 28 is provided with a central bore 29 in which is received the neck portion 18. The bore 29 does not extend through the piston but communicates with a series of ports 31 which communicate with the chamber 16. As viewed in FIG. 1, the right hand portion or head of the piston 28 is in the form of a truncated cone with the flat face 32 of the head being arranged to engage against the inner mouth of port 27 and effect closure thereof. The conical portion of the head affords an annular area 30 against which fluid pressure may act. The piston 28 is provided with a peripheral groove 33 to receive an O-ring 34 which affords a seal between the chamber 16 and piston 28.

The pilot valve includes a flanged spool 36 formed of suitable non-magnetic material arranged in abutting relation to the end face 35 of the body 15. Said end face is provided with an annular groove 37 in which is received an O-ring 38 which affords a fluid tight seal between the flange of the spool 36 and the body. A solenoid coil 39 is received between the flanges of the spool 36, as illustrated. The central opening of the spool 36 affords a chamber 41 in which is received a pilot piston 42, hereinafter to be described. An end member 43 is provided on the inner face 45 thereof with a central cylindrical boss 44, the end member 43 and boss being drilled axially to provide a vent port 46. The inner face 45 of the end member is provided with an annular groove 47 in which is received an O-ring 48 which affords a fluid tight seal between the end member 43 and the flange of spool 36.

It will be understood that suitable means such as longitudinally extending bolts may be provided for retaining in a well known manner all of the parts hereinabove described in assembled relationship.

The pilot piston 42 is generally cylindrical in form and is provided on the lead face 49 thereof with a centrally disposed conical protuberance 51 arranged to co-act with the outer mouth of the passage 19 and effect closure of said passage, in a manner as will be hereinafter described. The opposite face 52 of the piston 42, under certain conditions of operation, is arranged to abut against the mouth of passage 46 and effect closure of said passage. A plurality of coiled weak spring elements 55 suitably anchored in sockets provided in the faces 30 and 49 of the body 15 and piston 42, respectively, afford means for supporting the piston in coaxial alignment with the body 15 so that the conical protuberance 51 is disposed in registration with the passage 19. The spring elements also serve to normally retain the piston 42 in open position.

The operation of our improved solenoid valve is as follows: In the closed position of the main valve, the solenoid coil 39 normally is de-energized and the parts are in the relationship illustrated in FIG. 1. As is indicated by the arrows in FIG. 1, pressure fluid enters the port 22 and passes through the ports 31, piston bore 29, and passage 19 into the pilot valve chamber 41. Some of the pressure fluid in chamber 41 will pass through passages 21 into the portion of chamber 16 which is to the left of the O-ring seal 33. Thus, the pressure fluid acts on the annular rearward face 53 of the main piston 28, and because the effective area of face 53 is greater than the annular area 30, the piston 28 is urged to closed position where the face 32 of the piston is maintained in tight sealing engagement against the mouth of port 27. In this position the port 27 is closed off against the passage of any pressure fluid from the inlet port 22. It will also be understood that some pressure fluid may leak from the bore 29 through the clearance area between the bore 29 and projection 21 into the portion of chamber 16 rearwardly of the main piston.

Referring to FIG. 1, it will be seen the effective area against which pressure fluid may act on the face 52 of the pilot piston 42 is reduced by the area of the boss 44 against which the pilot piston is arranged to abut, thus, the effective area of the face 49 of the pilot piston 41 is greater than that of face 52 and, accordingly, the pressure differential tends to urge the pilot piston 42 to engage against the mouth of passage 46 sealing the same and preventing any discharge of pressure fluid through the vent port 46.

To effect opening of the main valve, the solenoid coil 39 is energized. The magnetic force acting on the pilot piston 42 is sufficient to overcome the pressure differential between the opposite faces 49 and 52 of the piston, as well as the resistance of the weak spring elements 55, so that the piston 42 is urged to the position illustrated in FIG. 2 wherein the conical projection 51 engages the mouth of the passage 19 closing the same against the flow of any pressure fluid therethrough.

Referring to FIG. 2, it will be seen that while the conical projection 51 is received within the mouth of the passage 19, the face 49 of the pilot piston is actually spaced from the face 35 of the body 15 so that clearance is afforded for the passage of any pressure fluid from the passages 21 which communicate with the portion of chamber 16 which is rearwardly of the piston 28. Thus, this chamber portion is vented to the atmosphere by reason of vent port 46 being open, as indicated by the arrows. Accordingly, pressure fluid entering port 22 into chamber 16 will act on the annular face 30 of the piston 28 causing the piston to move to the left very rapidly and substantially with a minimum of resistance to assume the position illustrated in FIG. 3 whereby the discharge port 27 is uncovered to afford substantially direct communication between the inlet port 22 and the port 27, permitting a burst or blast of pressure fluid to be discharged through the discharge port 27.

Upon de-energization of the solenoid coil 39 the magnetic force acting to maintain the pilot piston 42 in closed position is removed and pressure fluid which enters through the ports 31 and into the passage 19 acts on the pilot piston 42 to move the same rapidly to the position illustrated in FIG. 1 whereby the vent passage 46 is caused to be closed and the pressure fluid is caused to act on the rearward face 53 of the main piston 28 and move the same to the right to close off the discharge port 27 which remains closed until the solenoid coil 39 is again energized.

The valve construction of our invention is capable of extremely rapid cycling even under conditions of high fluid pressure. For example, at a pressure of 1200 p.s.i. the total cycling interval required for a complete cycle of operations is of the order of 20 milliseconds. Under lower pressure conditions the cycling interval is correspondingly decreased. The power consumption is extremely low because available fluid pressure is utilized in assisting the movement of the pilot piston to operative position. For example, at a pressure condition of 1200 p.s.i. the power consumption is of the order of 160 milliamps with corresponding reductions in power consumption as pressure conditions are reduced.

Our novel valve is intended for use under a wide range of temperature conditions, for example, within the range of −65 degrees to 385 degrees F. It will be understood that where the temperature conditions are not critical the main piston may be fabricated of a suitable plastic material.

It will be readily apparent from the foregoing that, because of the extremely simplified construction of our invention, the time required for assembly is minimal, being of the order of 30 seconds with no assembly adjustments being required. On the other hand, in corresponding prior art devices, because of the complexity in the constructions, approximately one and one-half hours of assembly time is required, including three critical adjustments. It will also be apparent that because there are only two moving parts and no surfaces subject to wear, the device of our invention is capable of trouble-free extended service life.

Various changes coming within the spirit of our invention may suggest themselves to those skilled in the art; hence, we do not wish to be limited to the specific embodiments shown and described or uses mentioned, but intend the same to be merely exemplary, the scope of our invention being limited only by the appended claims.

We claim:

1. A solenoid operated valve comprising,
  (a) a body having first and second end walls and defining a first cylindrical chamber,
  (b) said body having an inlet port for admitting pressure fluid into said chamber,
  (c) said first end wall having a discharge port communicating with said cylindrical chamber,
  (d) said second end wall having a cylindrical projection extending into said chamber and a first passage through said wall and projection,
  (e) said discharge port and said projection being in axial registration with said cylindrical chamber,
  (f) said second wall having at least a second passage therethrough and disposed intermediate the wall of the cylindrical chamber and the projection,
  (g) a first piston received within said cylindrical chamber,
  (h) means carried on said first piston for effecting a seal between said first piston and said cylindrical chamber,
  (i) said first piston having an axial bore to receive said projecton whereby said piston is guided for axial reciprocation,
  (j) said first piston having a head portion arranged to effect closure of said discharge port and having an annular area outwardly of and concentric with said head portion on which pressure fluid may act,
  (k) said first piston having a third passage through said annular area affording communication between said cylindrical chamber and the bore of said first piston,
  (l) a solenoid coil in the form of an annulus disposed adjacent said second wall,
  (m) the space within said coil affording a second cylindrical chamber,
  (n) said first passage affording communication between the axial bore of said first piston and said second cylindrical chamber,
  (o) a second piston constituting a solenoid armature reciprocable within said second cylindrical chamber and having centrally disposed means for effecting closure of said first passage,
  (p) a third wall abutting said coil and affording a closure for said second cylindrical chamber,
  (q) said third wall having a fourth passage centrally disposed and affording a vent for said second cylindrical chamber,
  (r) said second piston when said coil is de-energized being retained in open relation to said first passage but in closed relation to said fourth passage whereby pressure fluid entering through said inlet port may pass through communicating passages and chambers and act on the rearward face of said first piston to maintain said first piston in closed relation to said discharge port,
  (s) said second piston when said coil is energized being caused to move to closing position in relation to said first passage but in open position to said fourth passage whereby pressure fluid in the first cylindrical chamber is prevented from passing through said first passage to act on the rearward face of said first piston, (t) the portion of the first cylindrical chamber rearwardly of the first piston being vented to the atmosphere through communicating passages, (u) said first piston being thereby moved by pressure fluid acting on the annular area of the first piston away from the discharge port to open the same and permit pressure fluid from said first cylindrical chamber to be discharged through said discharge port.

2. A solenoid operated valve comprising, (a) a body having first and second end walls and an intermediate wall and defining first and second axially alined cylindrical chambers separated by said intermediate wall, (b) said body having an inlet port for admitting pressure fluid into said first cylindrical chamber, (c) said first wall having a discharge port, (d) said second wall having a vent port, (e) said intermediate wall having a central passage therethrough, (f) said discharge port, said vent port and said central passage being in coaxial registration with said cylindrical chambers, (g) a main piston reciprocable within said first cylindrical chamber, (h) said main piston having a forward end face arranged to abut said discharge port to close the same and having an annular area concentric with said end face on which pressure fluid may act, (i) said main piston having an axial bore opening rearwardly and communicating with said central passage, (j) said main piston having a first passage affording communication between said first cylindrical chamber and said piston bore, (k) said intermediate wall having a second passage connecting said first cylindrical chamber with said second cylindrical chamber, (l) a solenoid coil circumposed about said second cylindrical chamber, (m) a pilot piston constituting a solenoid armature reciprocable within said second cylindrical chamber and arranged to selectively close said vent port, or said central passage, (n) said main piston being arranged normally to close said discharge port when said central passage is open, (o) and said main piston being caused to move rapidly away from said discharge port to open the same when said central passage is closed by said pilot piston upon energization of said solenoid coil whereby pressure fluid may flow from said inlet port through said discharge port.

3. A solenoid operated valve comprising, (a) a body having first and second end walls and an intermediate wall defining first and second cylindrical chambers separated by said intermediate wall, (b) said body having an inlet port for admitting pressure fluid into said first cylindrical chamber, (c) said first wall having a discharge port, (d) said intermediate wall having first and second passages therethrough, (e) a main piston reciprocable in said first cylindrical chamber, (f) said main piston having a forward end face arranged to abut said discharge port to close the same and having an annular area concentric with said end face on which pressure fluid may act, (g) said main piston having a third passage communicating with said first passage whereby communication is afforded between the forward portion of said first cylindrical chamber and said second cylindrical chamber, (h) said second passage affording communication between the rearward portion of said first cylindrical chamber and said second cylindrical chamber, (i) a solenoid coil circumposed about said second cylindrical chamber, (j) a pilot piston constituting a solenoid armature reciprocable within said second cylindrical chamber and arranged to alternately close said vent port or said first passage, (k) said main piston being arranged normally to close said discharge port when said first passage is open, (l) said coil when energized effecting movement of said pilot piston in a direction to close said first passage and to open said vent port whereby pressure fluid in the rearward portion of said first cylindrical chamber is vented to the atmosphere and pressure fluid entering through said inlet port may act on said first piston to open said discharge port so that pressure fluid may pass therethrough.

4. A solenoid operated valve comprising, (a) a body having first and second end walls and defining a first cylindrical chamber, (b) said body having an inlet port for admitting pressure fluid into said chamber, (c) said first end wall having a discharge port communicating with said chamber, (d) said second end wall having a cylindrical projection extending into said chamber and a first passage through said wall and projection, (e) said discharge port and said projection being in axial registration with said chamber, (f) said second wall having at least one second passage therethrough disposed intermediate the wall of the chamber and the projection, (g) a first piston received within said chamber, (h) means on said first piston for effecting a seal between said first piston and said first chamber, (i) said first piston having an axial bore to receive said projection whereby said piston is guided for axial reciprocation, (j) said first piston having a head portion arranged to effect closure of said discharge port and having an annular area concentric with said head portion on which pressure fluid may act, (k) said first piston having a third passage through said annular area affording communication between said chamber and the bore of said first piston, (l) a solenoid coil in the form of an annulus disposed adjacent said second wall, the space within said coil affording a second cylindrical chamber, (m) said first passage affording communication between the axial bore of said first piston and said second chamber, (n) a second piston constituting a solenoid armature reciprocable within said second cylindrical chamber and having centrally disposed means for effecting closure of said first passage, (o) a third wall abutting said coil and affording a closure for said second cylindrical chamber, (p) said third wall having a fourth passage centrally disposed and affording a vent for said cylindrical chamber, (q) said first and second pistons being normally urged by respective differentials in fluid pressure acting thereon in directions to close said discharge port and said fourth passage respectively, (r) said coil when energized imposing a force on said second piston sufficient to overcome the pressure differential acting thereon to open said fourth passage and close said first passage thereby to effect a pressure differential in an opposite direction on said first piston to urge said first piston in a direction to open said discharge port to permit the discharge of pressure fluid therethrough.

5. A solenoid operated valve comprising,
(a) a body having first and second end walls and an intermediate wall defining first and second axially aligned cylindrical chambers separated by said intermediate wall,
(b) said body having an inlet port for admitting pressure fluid into said first cylindrical chamber,
(c) said first wall having a discharge port,
(d) said second wall having a vent port,
(e) said intermediate wall having a central passage therethrough,
(f) said discharge port, said vent port and said central passage being in coaxial registration with said first and second cylindrical chambers,
(g) a main piston reciprocable within said first cylindrical chamber,
(h) said main piston having a forward end face arranged to abut said discharge port to close the same and having an annular area concentric with said end face on which pressure fluid may act,
(i) said main piston having an axial bore opening rearwardly and communicating with said central passage,
(j) said main piston having a first passage affording communication between said first cylindrical chamber and said piston bore,
(k) said intermediate wall having a second passage connecting said first cylindrical chamber with said second cylindrical chamber,
(l) a solenoid coil circumposed about said second cylindrical chamber,
(m) a pilot piston constituting a solenoid armature reciprocable within said second cylindrical chamber,
(n) said main and pilot pistons being normally urged by differentials in fluid pressure acting thereon respectively in directions to close said discharge port and said vent port,
(o) said coil when energized imposing a force on said pilot piston sufficient to overcome the pressure differential acting thereon to open said vent port and to close said central passage thereby to effect a pressure differential in an opposite direction on said main piston to urge said main piston in a direction to open said discharge port whereby pressure fluid entering into said first clyindrical chamber is discharged through said discharge port.

References Cited by the Examiner
UNITED STATES PATENTS

| | | | |
|---|---|---|---|
| 1,961,599 | 6/1934 | Schwitzer | 251—30 |
| 2,887,127 | 5/1959 | Broadbent | 251—30 |

M. CARY NELSON, *Primary Examiner.*

J. KNIGHT, *Assistant Examiner.*